(12) United States Patent
Martini

(10) Patent No.: US 11,054,010 B2
(45) Date of Patent: Jul. 6, 2021

(54) SPUR GEAR DIFFERENTIAL WITH NON-DESTRUCTIVELY DEMOUNTABLE SUN GEARS

(71) Applicant: Schaeffler Technologies AG & Co. KG, Herzogenaurach (DE)

(72) Inventor: Harald Martini, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 108 days.

(21) Appl. No.: 16/326,942

(22) PCT Filed: Jul. 31, 2017

(86) PCT No.: PCT/DE2017/100635
§ 371 (c)(1),
(2) Date: Feb. 21, 2019

(87) PCT Pub. No.: WO2018/046040
PCT Pub. Date: Mar. 15, 2018

(65) Prior Publication Data
US 2019/0211911 A1 Jul. 11, 2019

(30) Foreign Application Priority Data

Sep. 6, 2016 (DE) .......................... 102016216799.5

(51) Int. Cl.
*F16H 48/11* (2012.01)
*F16H 48/10* (2012.01)
*F16H 57/08* (2006.01)

(52) U.S. Cl.
CPC ............. *F16H 48/11* (2013.01); *F16H 48/10* (2013.01); *F16H 2048/106* (2013.01)

(58) Field of Classification Search
CPC .... F16H 48/11; F16H 48/10; F16H 2048/106; F16H 57/082
See application file for complete search history.

(56) References Cited

U.S. PATENT DOCUMENTS

| 3,251,244 | A | * | 5/1966 | Nickell | ................... | F16H 48/10 |
| | | | | | | 475/90 |
| 3,527,121 | A | * | 9/1970 | Moore | ................... | F16H 57/082 |
| | | | | | | 475/338 |
| 9,115,795 | B2 | * | 8/2015 | Biermann | ............ | F16H 57/082 |

(Continued)

FOREIGN PATENT DOCUMENTS

| DE | 102007004710 A1 | 8/2008 |
| DE | 102007004712 A1 | 8/2008 |

(Continued)

*Primary Examiner* — Tinh Dang

(57) ABSTRACT

A spur-gear differential having first and second planet carrier halves rotationally fixedly connected to first and second bearings, respectively and including holes for planet bolts and connecting rivets. Hole walls at least partially surround each hole and are formed from a material of the first and second planet carrier halves. The first and second bearings have bearing rings. At least one region of an inner edge of the first planet carrier half is arranged radially further out than an outer edge of toothing of a first sun gear. At least one region of an inner edge of the second planet carrier half is arranged radially further out than an outer edge of toothing of a second sun gear.

18 Claims, 3 Drawing Sheets

(56) References Cited

U.S. PATENT DOCUMENTS

| | | | | |
|---|---|---|---|---|
| 9,267,593 | B2* | 2/2016 | Biermann | F16H 48/38 |
| 9,810,109 | B2* | 11/2017 | Pluta | F01L 1/352 |
| 10,281,006 | B2* | 5/2019 | Hirano | F16H 37/02 |
| 10,344,825 | B2* | 7/2019 | Wigsten | F16H 1/2863 |
| 10,393,249 | B2* | 8/2019 | Ling | F16H 48/11 |
| 10,408,096 | B2* | 9/2019 | Pluta | F16H 57/082 |
| 10,724,625 | B2* | 7/2020 | Karlak | B64C 27/22 |
| 2011/0045934 | A1* | 2/2011 | Biermann | F16H 48/11 475/252 |
| 2014/0329634 | A1* | 11/2014 | Biermann | F16H 48/38 475/220 |
| 2014/0378264 | A1* | 12/2014 | Biermann | F16H 48/10 475/248 |
| 2018/0010668 | A1* | 1/2018 | Hirano | B60K 6/383 |
| 2018/0320564 | A1* | 11/2018 | Pluta | F16H 35/008 |

FOREIGN PATENT DOCUMENTS

| | | |
|---|---|---|
| DE | 102012206449 A1 | 10/2013 |
| GB | 800230 A | 8/1958 |

\* cited by examiner

SPUR GEAR DIFFERENTIAL WITH NON-DESTRUCTIVELY DEMOUNTABLE SUN GEARS

CROSS-REFERENCE TO RELATED APPLICATION

The present application is the U.S. national stage application pursuant to 35 U.S.C. § 371 of International Application No. PCT/DE2017/100635, filed Jul. 31, 2017, which application claims priority from German Patent Application No. DE 10 2016 216 799.5, filed Sep. 6, 2016, which applications are incorporated herein by reference in their entireties.

TECHNICAL FIELD

The present disclosure relates to a spur gear differential with a planet carrier, which is connected in a non-rotatable manner to a bearing and has holes for planet bolts and connection rivets. The hole walls consist of the material of the planet carrier, which completely surround each hole. The bearing comprises a bearing ring.

BACKGROUND

A modified inner bearing ring for centering a planet carrier is known from DE 10 2012 206 449 A1. This published, unexamined patent application discloses a planet transmission such as a differential transmission with a planet carrier on which planet gears are rotatably connected which engage with at least one sun gear in a combing manner. The planet carrier can be connected to a drive gear, such as a hollow gear with outer toothing. Furthermore, a bearing with an inner bearing ring and an outer bearing ring, such as a roller bearing, rotatably supports the planet carrier in a stationary housing, such as a transmission housing, in a manner which axially and/or radially determines the position. The inner bearing ring is connected to the stationary housing.

However, the planet transmission known from the prior art has the disadvantage that it cannot be disassembled again or only with great expense, and as a rule not without being destroyed. Furthermore, separate parts in the prior art for securing the planet bolts such as, e.g., casings, are required. This results in greater production costs.

Furthermore, the planet transmissions already known from the prior art are fixed by the outside diameter (or the crown line diameter) of the drive gear in their outer dimension. That means that changes in the construction can be made only if they do not make any change, in particular no enlargement of the outside diameter, or have it as a direct consequence. That means that the existing or available structural space for the planet transmission is clearly limited.

SUMMARY

The present disclosure describes a planet transmission, in particular a generic spur gear differential, in which at least one region of an inner edge of a planet carrier is arranged further outward than the outer edge of the toothing of a sun gear. The discussion that follows is directed to a spur gear differential.

In an example embodiment, the entire inner edge of the planet carrier is arranged radially further outward than the outer edge of the toothing of the sun gear. This makes it possible to mount the sun gear after the mounting of the planet gears on the planet carrier and to be able to also dismount the latter without destruction.

In an example embodiment, the planet carrier comprises two planet carrier halves whose inner edges/inside edges rotate on the same radial level or are offset relative to one another in a radial direction.

In an example embodiment, two sun gears with different sizes are used. This simplifies the mounting and the same translation is realized here by a profile shifting of the corresponding planet gears.

In an example embodiment, the one inner edge or both inner edges is/are larger in diameter than the crown line diameter of the larger one of the two sun gears.

In an example embodiment, a bearing ring or a carrier part contacts a planet carrier half and a roller body of the bearing. In this manner, the bearing and the carrier part which are both required for the bearing and positioning of the planet carrier are designed, for example, integrally/in one piece or as two separate parts. The carrier part can replace, for example, one of the bearing rings of the bearing.

In an example embodiment, the bearing ring or the carrier part is constructed with a cup-like shape. The cup shape can be realized, for example, in a very simple and economical manner by deep drawing.

In an example embodiment, the bearing ring or the carrier part is designed to be deep-drawn. Deep drawing is an economical manufacturing method for which reason production costs/manufacturing costs can be reduced in this manner.

In an example embodiment, a deep-drawn bearing ring or carrier part is constructed as a structural sheet part.

In an example embodiment, the bearing ring or the carrier part is casehardened. As a result of the casehardening, the material of the bearing ring or of the carrier part receives an additional hardness which protects, e.g., against wear, which can lengthen the service life of the bearing ring and/or of the carrier part.

In an example embodiment, the casing known from the prior art or an extended outer ring is integrally made available as an axial stop for the planet bolts. This can reduce expenses since the axial stop no longer requires a separate structural component. A ratio of the crown line diameter of the hollow gear to twice the distance from the planet bolts to an axis of rotation of the hollow gear is smaller here than 1.8 and greater than 1.5. A ratio of the double distance from a planet bolt to the axis of rotation of the hollow gear to the outside diameter of an outer bearing ring is less than 1.2.

The above ratios describe the entire diameter of the differential by the diameter of the hollow gear. In addition, the hollow gear (drive gear) serves as a bearing structure of the carrier plates and planet carrier halves. The carrier plates are held at a distance over the inner edge of the hollow gear. The plates and the hollow gear are connected to each other via welding connections such as, e.g., welding points or welding seams.

The present disclosure makes possible a very compact design of a spur gear differential, which requires less radial space (or for the carrier structure). The minimum circumscribed circles of the teeth, and therefore the radial are reduced to the limits.

Furthermore, a spur gear differential according to the present disclosure provides a fastening structure or mounting structure of a previously assembled carrier unit with planet gears but without sun gears. In this case, the inside diameter of the carrier is at least slightly larger than the outside diameter of the sun gears in order that the sun gear can be inserted into the unit and also removed from it again. To this end, the coverings are inserted into the plate hole by a clearance fit.

This can bring it about that the covering or the carrier part rotates in the plates. The distance of the planet bolts from the axis of rotation of the hollow gear of the inner planet gear set is so small that the (planet) carrier must provide skirtings/hole walls which surround the bearing holes of the planet bolts. These skirtings/hole walls interfere with the outside diameter of the carrier part. Therefore, the carrier part comprises recesses/setoffs/pans/pockets which are adapted to the skirtings/hole walls so that the skirtings and the recesses prevent the rotating of the carrier part.

The present disclosure is explained in detail with the aid of figures in which different embodiments are shown. In the figures.

The figures are only of a schematic nature and serve only for the understanding of the present disclosure. The same elements are provided with the same reference numerals.

Features of the individual exemplary embodiments can also be realized in other exemplary embodiments. They can therefore be interchanged.

Figure 1:
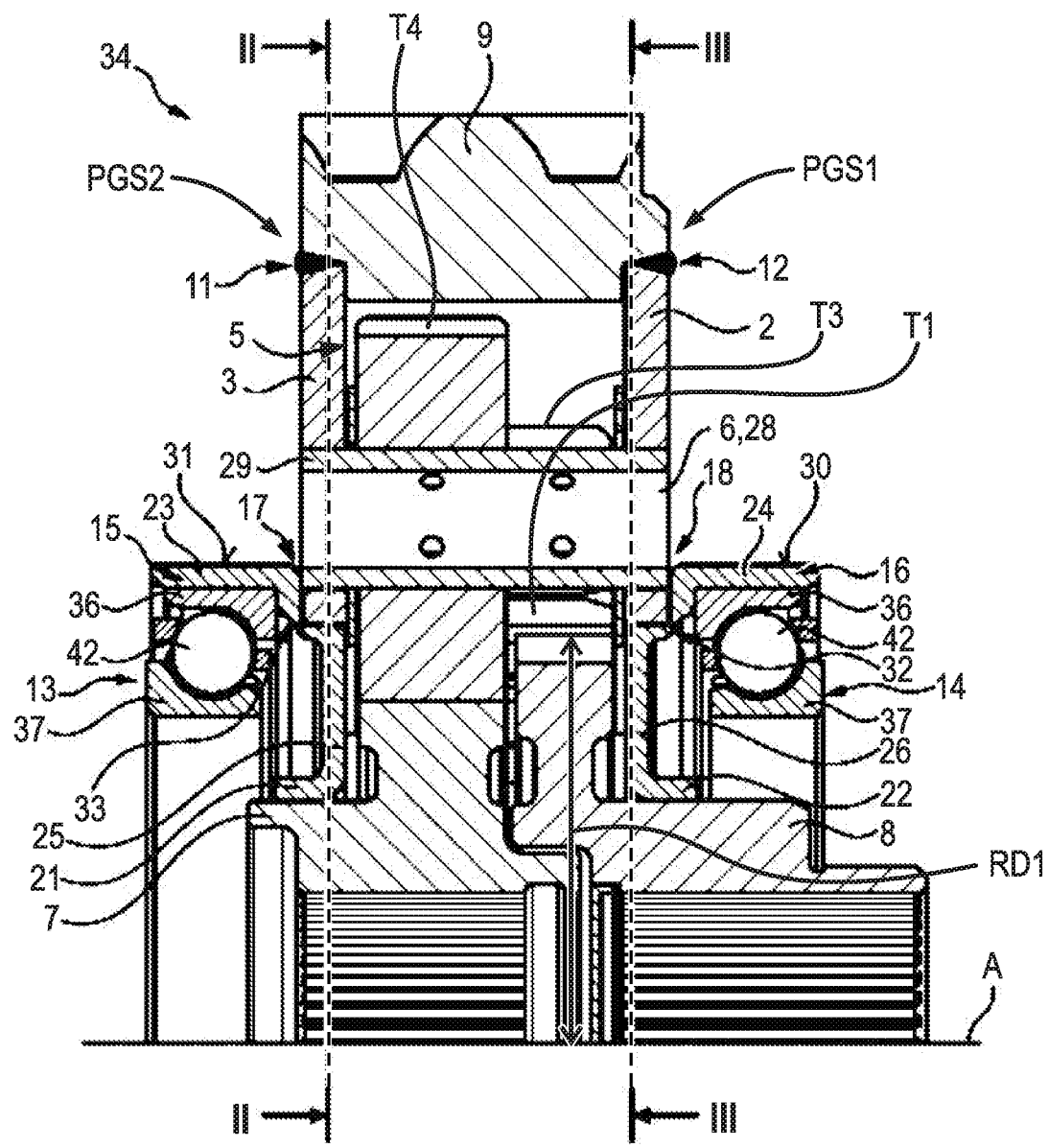
FIG. 1 is a partial longitudinal section of a spur gear differential.
Figure 2:
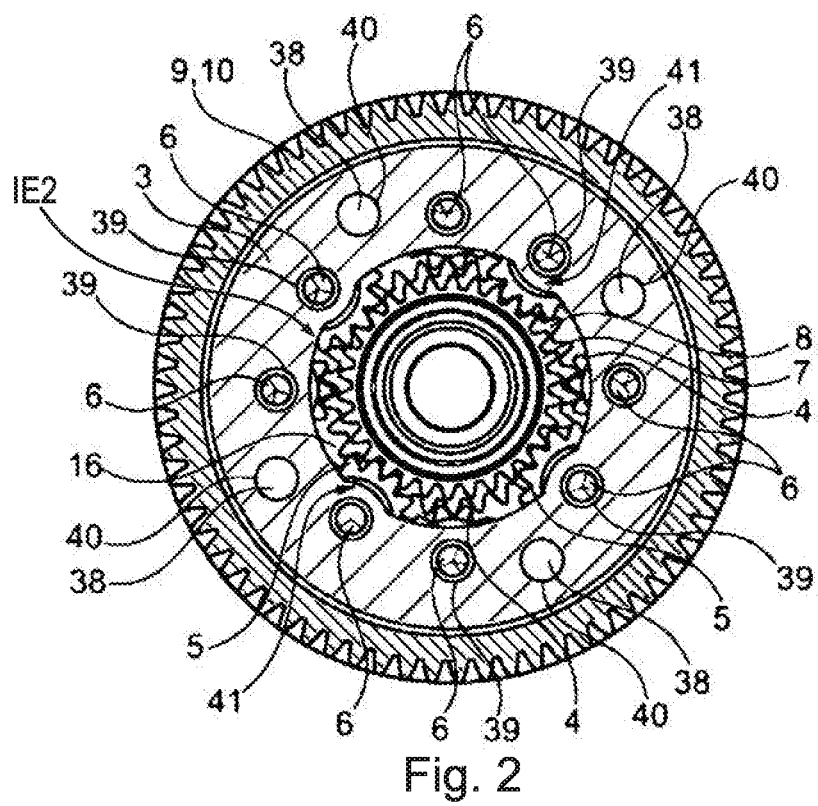
FIG. 2 is a sectional view of the spur gear differential along line 2-2 in FIG. 1.
Figure 3:
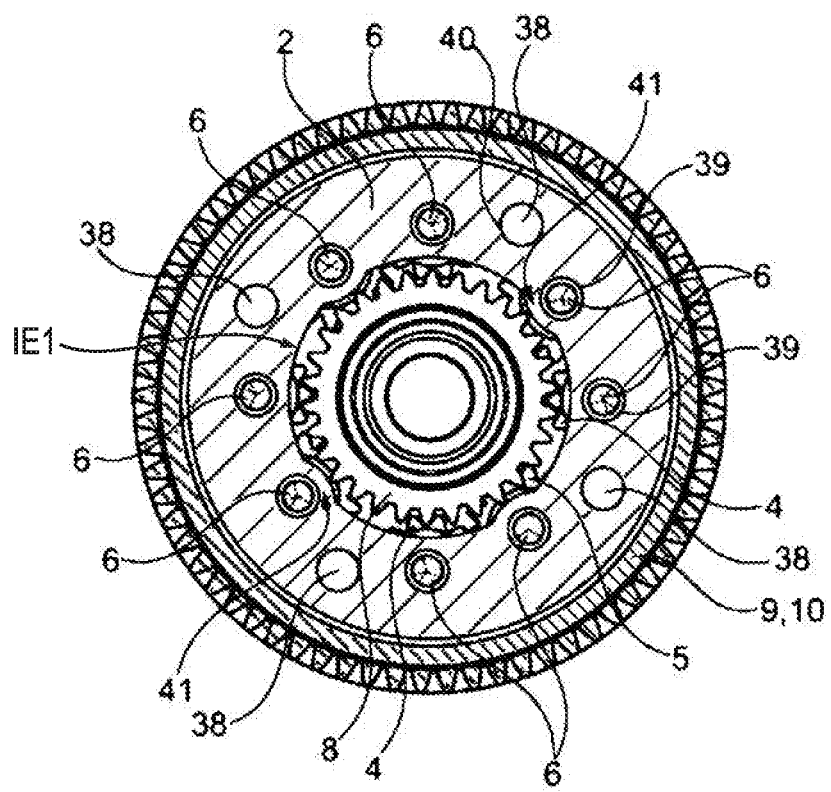
FIG. 3 is a sectional view of the spur gear differential along line 3-3 in FIG. 1.

FIG. 1 shows a sectional view of a longitudinal section of spur gear differential 34 according to the present disclosure. FIG. 2 is a sectional view of the spur gear differential along line 2-2 in FIG. 1. FIG. 3 is a sectional view of the spur gear differential along line 3-3 in FIG. 1. Spur gear differential 34 comprises planet gear set PGS1 and planet gear set PGS2. Planet gear set PGS1 includes planet carrier half 2 and planet gears 4 rotatably connected via planet bolts 6 to planet carrier half 2. Planet gear set PGS2 includes planet carrier half 3 and planet gears 5 rotatably connected via planet bolts 6 to planet carrier half 3. Planet carrier half 2 includes radially inner edge IE1. Planet carrier half 3 includes radially inner edge IE2.

Planet gear set PGS1 includes sun gear 7. Planet gear set PGS2 includes sun gear 8. At least a portion of radially inner edge IE1 is arranged, or is located, radially outward of sun gear 7. In the example of FIG. 1, all of radially inner edge IE1 is located radially outward of sun gear 7. At least a portion of radially inner edge IE2 is arranged, or is located, radially outward of sun gear 8. In the example of FIG. 1, all of radially inner edge IE2 is located radially outward of sun gear 8. In the example of FIG. 1: all of radially inner edge IE1 is located radially outward of sun gears 7 and 8; and all of radially inner edge IE2 is located radially outward of sun gears 7 and 8.

In the example of FIG. 1, sun gear 8 is larger than sun gear 7. For example as seen in FIG. 1, sun gear 7 extends radially past sun gear 7. Planet gears 4 and 5 are axially located between planet carrier halves 2 and 3. Planet gears 4 have a combing engagement with sun gear 7 and planet gears 5 have a combing engagement with sun gear 8. That is, planet gears 4 are intermeshed with sun gear 7 and planet gears 5 are intermeshed with sun gear 8. Sun gears 7 and 8 lie, relative to spur gear differential 34, radially further inward than planet gears 4 and 5, respectively. Drive gear 9 in the form of a hollow gear with outer toothing, which is connected in a rotation-proof manner via welding connections 11 and 12 to planet carrier halves 2 and 3, respectively, is located radially further outward than planet gears 4 and 5, which realizes a transmission of torque.

Planet carrier halves 2 and 3 are rotatably supported with their positions axially and/or radially determined via bearing 13 and bearing 14, respectively, in a stationary housing (not shown). Carrier parts 15 and 16 are used as support receptacles and enable a rotation-proof connection between planet carrier halves 2 and 3 and bearings 13 and 14, respectively. In an example embodiment, one or both of carrier parts 15 and 16 comprise axial stops 17 and 18, respectively, constructed in the form of completely circulating offsets. Stops 17 and 18 serve as axial safety for planet bolts 6.

In an example embodiment, one or both of carrier part 15 and 16 are offsets designed in two stages, as shown in FIG. 1. Carrier parts 15 and 16 additionally serve for securing planet bolts 6 and also as axial positioning/fixing for planet carrier halves 2 and 3, respectively.

In an example embodiment, one or both of carrier parts 15 and 16 are constructed as a deep-drawn structural sheet part which have a substantially annular shape. In an example embodiment, one or both of carrier parts 15 and 16 have inside diameters d1 and outside diameters D1 (see also FIG. 4). Carrier parts 15 and 16 comprise, on an inside diameter, inner flange sections 21 and 22, respectively, which serve as contact surfaces or support surfaces for sun wheel 7 and sun wheel 8, respectively. Outer flange sections 23 and 24 are formed on outside diameter D1 of carrier part 15 and 16, respectively. A section, viewed in an axial direction parallel to axis of rotation A of spur gear differential 34, is constructed offset outward to main bodies 25 and 26 of carrier part 15 and 16, respectively, via completely circumferential offsets. Flange section 23 and 24 serve, as FIG. 1 shows, as bearing receptacles for bearings 13 and 14, respectively.

Figure 4:
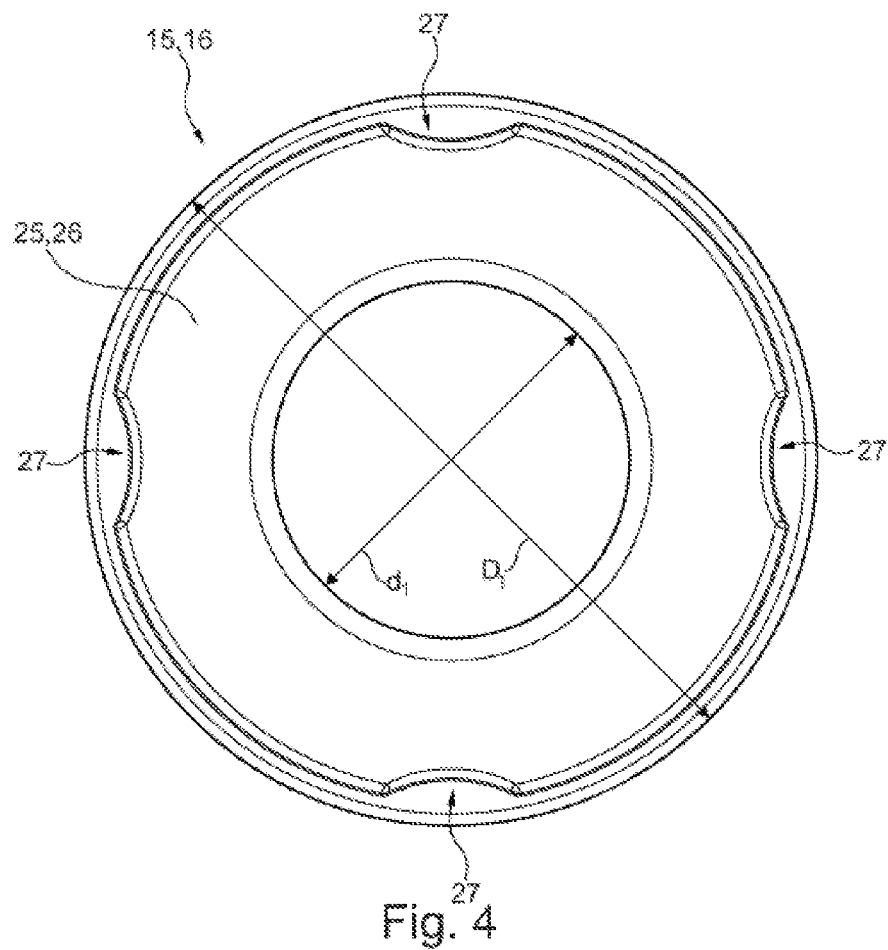
FIG. 4 is a top view of a carrier part in FIG. 1.

As seen from FIG. 4, carrier parts 15 and 16 each comprise drawn pockets 27, for example, uniformly distributed over the respective circumferences. Pockets 27 serve, among other things, to transfer torque between planet carrier halves 2 and 3 and carrier parts 15 and 16, respectively.

Referring back to FIG. 1, planet bolts 6 are constructed as hollow bolts having walls 29 with a constant thickness. An inside diameter of wall 29 closes flush with circumferential surfaces 30 and 31 of outer flange sections 23 and 24, respectively.

Axial stops 17 and 18 are constructed in the form of extended regions 32 and 33, respectively, or a tapering which is achieved by a drawing step. In an example embodiment, carrier part 15 and 16 are tempered and/or hardened in the region of pockets 27 (see FIG. 4), in particular to reduce or prevent wear and a resulting premature failure or replacement of the structural component.

Sun gears 7 and 8 have the same number of teeth as planet gears 4 and 5, respectively, in order to ensure a uniform translation. In order that planet gears 4 and 5 cannot comb with each other at sun gears 7 and 8, respectively, one of the planet gears (here planet gear 4, such as can be seen, e.g., in FIG. 2) has longer teeth than the other of planet gears 4 or 5, as a result of which a profile shifting is generated. The difference in tooth length ensures that planet gears 4 and 5 cannot comb with each other in spite of a very compact construction.

As seen in FIG. 1, planet carrier halves 2 and 3 and carrier parts 15 and 16, as well as planet bolts 6 and carrier part 15 and 16, are connected to each other by a form closure. In an example embodiment, the form closure is an interference fit, as a result of which relative rotation between carrier part 15 and 16 and planet carrier halves 2 and 3, respectively, is prevented. In an example embodiment, carrier parts 15 and 16: are constructed in two stages in the region for the receiving of the planet carrier halves 2 and 3, respectively, and planet bolts 6; and serve as axial contact surfaces for positioning of planet bolts 6 as well as of planet carrier halves 2 and 3.

Bearings 13 and 14 include: outer bearing rings 36 connected in a non-rotatable manner to carrier parts 15 and 16, respectively; and inner bearing rings 37. Roller bodies 42 roll off outer bearing rings 36.

In an example embodiment (not shown), carrier part 15 or 16 is provided with a running surface on which roller bodies 42 of bearing 13 or 14 roll off. The running surface is provided on an (inner) circumferential surface of carrier part 15 or 16 facing bearing 13 or 14, respectively. As a result, outer bearing ring 36 can be eliminated, or bearing ring 36 can be constructed integrally with the carrier part 15 or 16. Thus, carrier parts 15 and 16 are more appropriately designated structural bearing components.

FIG. 2 and FIG. 3 each show a top view along line 2-2 in FIG. 1 and along line 3-3 in FIG. 1, respectively. Therefore, FIG. 2 is a quasi-lateral view of spur gear differential 34 viewed from the left in FIG. 1, and FIG. 3 is a quasi-lateral view of spur gear differential 34 from the right in FIG. 1.

The views shown in FIGS. 3 and 2 serve to clarify the intermeshing of planet gears 4 and 5 with sun gears 7 and 8, respectively. As seen in FIG. 2, sun gear 7 has a smaller outside diameter than sun gear 8. Therefore, planet gears 4 have longer teeth than planet gears 5. As seen in FIG. 2 and FIG. 3, each of the planet gears 4 and 5 is fastened by a planet bolt 6 to planet carrier half 2 or 3, respectively. Bores 39 are provided in planet carrier halves 2 and 3, into which planet bolts 6 can be pushed in/inserted/added.

Furthermore, it can be readily recognized at least in FIGS. 2 and 3, that planet carrier halves 2 and 3 are additionally connected or fastened by connecting rivets 38 to the form closure (see FIG. 1) with carrier part 15 and 16. Bores 40 are provided in planet carrier halves 2 and 3 for rivets 38.

Since planet bolts 6 and/or connection rivets 38 are positioned in part very close to inner edges IE1 and IE2 of planet carrier halves 2 and 3, respectively, material recesses in the form of hole walls 41 are formed in inner edges IE1 and IE2, respectively, in the region of bores 39. Hole walls 41 at least partially surround bores 39.

Inner edge IE1 and inner edge IE2 include segments SG1 and SG2. Hole walls 41 are interleaved with segments SG1 and SG2, extend radially inward from segments SG1 and SG2, and are adapted in their shape to the outer contour of bores 39. Therefore, hole walls 41 prevent the material of planet carrier halves 2 and 3 from tearing out by stresses acting on planet bolts 6 and therefore on bores 39 during operation.

Radially inner edges IE1 and IE2, in particular portions of hole walls 41 extending radially inwardly, positively engage into pockets 27 of carrier parts 15 and 16.

LIST OF REFERENCE NUMERALS 2 planet carrier half
3 planet carrier half
4 planet gear
5 planet gear
6 planet bolt
7 sun gear
8 sun gear
9 drive gear
11 welding connection
12 welding connection
13 bearing
14 bearing
15 carrier part/structural bearing component
16 carrier part/structural bearing component
17 axial stop
18 axial stop
21 inner flange section
22 inner flange section
23 outer flange section
24 outer flange section
25 main body
26 main body
27 pocket
29 wall
30 circumferential surface
31 circumferential surface
32 extended region or tapering
33 extended region or tapering
34 spur gear differential
36 outer bearing ring
37 inner bearing ring
38 connection rivet
39 bore for planet bolt
40 bore for connection rivet
41 hole wall
42 roller body
A axis of rotation
d1 inside diameter
D1 outside diameter
IE1 inner edge
IE2 inner edge
PGS1 planet gear set
PGS2 planet gear set
SG1 segment, IE1
SG2 segment, IE2

The invention claimed is:

1. A spur gear differential, comprising:
a first sun gear;
a first planet carrier half including a first inner edge;
a first plurality of planet gears intermeshed with the first sun gear; and
a plurality of planet bolts connecting the first plurality of planet gears to the first planet carrier half, wherein an entirety of the first inner edge of the first planet carrier half is arranged radially outward of the first sun gear.

2. The spur gear differential of claim 1, further comprising:
a second planet carrier half including a second inner edge; and
a second plurality of planet gears connected to the second planet carrier half by the plurality of planet bolts, wherein an entirety of the second inner edge of the second planet carrier half is arranged radially outward of the first sun gear.

3. The spur gear differential of claim 2, further comprising:
a second sun gear intermeshed with the second plurality of planet gears, wherein the entirety of the second inner edge is arranged radially outward of an entirety of the second sun gear.

4. The spur gear differential of claim 2, wherein the first plurality of planet gears and the second plurality of planet gears are axially located between the first planet carrier half and the second planet carrier half.

5. The spur gear differential of claim 2, further comprising:

a second sun gear, wherein the second plurality of planet gears is intermeshed with the second sun gear, and the first sun gear extends radially past the second sun gear.

6. The spur gear differential of claim 1, further comprising:
a second sun gear;
a second planet carrier half including a second inner edge; and
a second plurality of planet gears intermeshed with the second sun gear and connected to the second planet carrier half by the plurality of planet bolts, wherein an entirety of the second inner edge of the second planet carrier half is arranged radially outward of the second sun gear.

7. The spur gear differential of claim 6, wherein the first sun gear extends radially past the second sun gear, and the entirety of the second inner edge is arranged radially outward of the entirety of the first sun gear.

8. The spur gear differential of claim 1, further comprising:
a carrier part connected in a non-rotatable manner to the first planet carrier half and including an outer flange section and a plurality of pockets extending radially inwardly from the outer flange section; and
a bearing connected in a non-rotatable manner to the carrier part, wherein the first planet carrier half includes a plurality of bores, the plurality of planet bolts is inserted into the plurality of bores, the first inner edge includes a plurality of hole walls at least partially surrounding the plurality of bores, and the plurality of hole walls is positively engaged into the plurality of pockets to connect the carrier part and the first planet carrier half in in a non-rotatable manner.

9. The spur gear differential of claim 8, wherein the carrier part includes an axial stop for the plurality of planet bolts.

10. The spur gear differential of claim 1, wherein the first planet carrier half includes a plurality of bores, the plurality of planet bolts is inserted into the plurality of bores, the first inner edge includes a plurality of hole walls at least partially surrounding the plurality of bores, the first inner edge includes a plurality of segments interleaved with the plurality of hole walls, and the plurality of hole walls extends radially inwardly from the plurality of segments.

11. A spur gear differential, comprising:
a first sun gear including a plurality of teeth;
a second sun gear;
a first planet carrier half including a first radially inner edge extending radially outwardly past the plurality of teeth of the first sun gear;
a first plurality of planet gears intermeshed with the plurality of teeth of the first sun gear;
a plurality of planet bolts connecting the first plurality of planet gears to the first planet carrier half;
a carrier part connected in a non-rotatable manner to the first planet carrier half and including an outer flange section and a plurality of pockets extending radially inwardly from the outer flange section; and
a bearing connected in a non-rotatable manner to the carrier part, wherein the first planet carrier half includes a plurality of bores, the plurality of planet bolts is inserted into the plurality of bores, the first radially inner edge includes a plurality of hole walls at least partially surrounding the plurality of bores, and the plurality of hole walls is positively engaged into the plurality of pockets to connect the carrier part and the first planet carrier half in in a non-rotatable manner.

12. The spur gear differential of claim 11, wherein the second sun gear includes a plurality of teeth, the spur gear differential further comprising:
a second planet carrier half including a second radially inner edge extending radially outwardly past the plurality of teeth of the second sun gear; and
a second plurality of planet gears intermeshed with the plurality of teeth of the second sun gear and connected to the second planet carrier half by the plurality of planet bolts.

13. The spur gear differential of claim 11, wherein the second sun gear includes a plurality of teeth, the spur gear differential further comprising:
a second planet carrier half including a second radially inner edge extending radially outwardly past the plurality of teeth of the first sun gear and the plurality of teeth of the second sun gear; and
a second plurality of planet gears intermeshed with the plurality of teeth of the second sun gear and connected to the second planet carrier half by the plurality of planet bolts.

14. The spur gear differential of claim 11, wherein the first planet carrier half includes a plurality of bores, the plurality of planet bolts is inserted into the plurality of bores, the first radially inner edge includes a plurality of hole walls at least partially surrounding the plurality of bores, the first radially inner edge includes a plurality of segments interleaved with the plurality of hole walls, and the plurality of hole walls extends radially inwardly from the plurality of segments.

15. A spur gear differential, comprising:
a first sun gear;
a second sun gear;
a first planet carrier half including a first radially inner edge extending radially outwardly past an entirety of the first sun gear;
a second planet carrier half including a second radially inner edge extending radially outwardly past an entirety of the second sun gear;
a first plurality of planet gears intermeshed with the first sun gear; and
a plurality of planet bolts connecting the first plurality of planet gears to the first planet carrier half.

16. The spur gear differential of claim 15, wherein:
the first sun gear extends radially past the entirety of the second sun gear; and,
the second radially inner edge extends radially outwardly past the entirety of the first sun gear.

17. The spur gear differential of claim 15, further comprising:
a second plurality of planet gears intermeshed with the second sun gear, connected to the second planet carrier half by the plurality of planet bolts, and axially disposed between the first plurality of planet gears and the second planet carrier half.

18. The spur gear differential of claim 15, further comprising:
a carrier part connected in a non-rotatable manner to the first planet carrier half and including an outer flange section and a plurality of pockets extending radially inwardly from the outer flange section; and
a bearing connected in a non-rotatable manner to the carrier part, wherein the first planet carrier half includes a plurality of bores, the plurality of planet bolts is inserted into the plurality of bores, the first radially inner edge includes a plurality of hole walls at least partially surrounding the plurality of bores, and the plurality of hole walls is positively engaged into the plurality of pockets to connect the carrier part and the first planet carrier half in in a non-rotatable manner.

* * * * *